US012728428B2

(12) United States Patent
Tashiro

(10) Patent No.: US 12,728,428 B2
(45) Date of Patent: Sep. 8, 2026

(54) SEPARATION DEVICE

(71) Applicant: BUNRI Incorporation, Tokyo (JP)

(72) Inventor: Makoto Tashiro, Tokyo (JP)

(73) Assignee: BUNRI Incorporation, Tokyo (JP)

( * ) Notice: Subject to any disclaimer, the term of this patent is extended or adjusted under 35 U.S.C. 154(b) by 392 days.

(21) Appl. No.: 18/490,427

(22) Filed: Oct. 19, 2023

(65) Prior Publication Data

US 2024/0066532 A1 Feb. 29, 2024

Related U.S. Application Data

(63) Continuation of application No. PCT/JP2022/030126, filed on Aug. 5, 2022.

(30) Foreign Application Priority Data

Dec. 22, 2021 (JP) ................................ 2021-208454

(51) Int. Cl.
*B04C 5/04* (2006.01)
*B04C 5/12* (2006.01)

(52) U.S. Cl.
CPC . *B04C 5/12* (2013.01); *B04C 5/04* (2013.01)

(58) Field of Classification Search
CPC .............. B04C 5/08; B04C 5/12; B04C 5/103
See application file for complete search history.

(56) References Cited

U.S. PATENT DOCUMENTS

| | | | |
|---|---|---|---|
| 2006/0091071 | A1 | 5/2006 | Tashiro et al. |
| 2019/0030547 | A1 | 1/2019 | Kuhlmann |

FOREIGN PATENT DOCUMENTS

| | | |
|---|---|---|
| CA | 1074733 | 4/1980 |
| CN | 1805797 | 7/2006 |
| CN | 1891344 | 1/2007 |
| CN | 110869133 | 3/2020 |
| CN | 112619911 | 4/2021 |
| DE | 3735106 | 4/1989 |
| JP | 2003210908 | 7/2003 |
| JP | 2005007212 | 1/2005 |
| JP | 2007090165 | 4/2007 |
| JP | 2008000665 | 1/2008 |

(Continued)

OTHER PUBLICATIONS

Hiroaki, Yamamoto et al—CN1891344A machine translation—Jan. 10, 2007 (Year: 2007).*

(Continued)

*Primary Examiner* — Bradley R Spies
(74) *Attorney, Agent, or Firm* — Burris Law, PLLC

(57) ABSTRACT

A separation device includes a cyclone extending along a central axis, including an introduction port for introducing a liquid containing foreign matter into an interior and a first discharge port provided at a lower end for discharging the foreign matter a clean case provided on an opposite side of the first discharge port, including a barrier wall on which a connecting hole is provided at an upper end of the cyclone and a second discharge port, and connected to the interior by the connecting hole, a gas-liquid separation tube extending from the connecting hole along the central axis, and an inner wall extending along the central axis, surrounding the gas-liquid separation tube.

7 Claims, 7 Drawing Sheets

(56) References Cited

FOREIGN PATENT DOCUMENTS

| | | |
|---|---|---|
| KR | 1020070001801 | 1/2007 |
| WO | 2013173852 | 11/2013 |

OTHER PUBLICATIONS

Office Action and Search Report issued in corresponding SG Application 11202307887U, issued Aug. 15, 2025, 9 pages.

Extended Search Report issued in corresponding EP Application 22910442.7, issued Oct. 30, 2025, 7 pages.

International Search Report issued in corresponding International Application PCT/JP2022/030126, mailed Sep. 6, 2022.

Office Action and Search Report issued in corresponding TW Application 111133360, issued Aug. 14, 2023, and an English Translation, 6 pages.

* cited by examiner

SEPARATION DEVICE

CROSS-REFERENCE TO RELATED APPLICATIONS

This application is a continuation of International Application No. PCT/JP2022/030126, filed on Aug. 5, 2022, and based upon and claiming the benefit of priority from prior Japanese Patent Application No. 2021-208454, filed on Dec. 22, 2021, the entire contents of all of which are incorporated herein by reference.

FIELD

The present disclosure relates generally to a separation device.

BACKGROUND

When machining metal material, etc., with machine tools, various fluids referred to as a grinding fluid, a cutting fluid, a coolant, etc., are used for the purpose of improving machining accuracy, extending tool life, and promoting discharge of chips, metal powder, etc.

These fluids are discharged from machine tools in a state of containing foreign matter such as chips and metal powder generated by machining. The discharged fluids are returned to the machine tool for reuse after the foreign matter is separated and removed. Various proposals have been made for separation devices for separating and removing foreign matter from fluids containing the foreign matter.

For example, JP 2008-000665 A discloses a foam suppressing type hydrocyclone. This cyclone is a liquid cyclone provided with a swirling flow chamber that has a portion whose inner diameter gradually decreases in the direction of gravity and swirls a separation target liquid-like substance supplied to a large diameter portion of the inner diameter to separate it into a substance with a large specific gravity and a liquid with a small specific gravity, and comprises: a cyclone body having at its lower end a discharge port through which the separated substance having the large specific gravity is discharged and having at its upper end an ascending flow path through which the separated liquid having the small specific gravity rises as a swirling flow; and an upper chamber provided at the upper end of the cyclone body into which the liquid having the low specific gravity flows through the ascending flow path, which is characterized in that a cross-sectional area of a flow path from which the liquid with the small specific gravity flows out from the upper chamber is regulated so that an air pressure P at the discharge port at the lower end of the cyclone body is in a negative pressure range of $-0.5$ kg/cm$^2$G P≤0 kg/cm$^2$G in gauge pressure.

This cyclone has the problem of sufficiently suppressing foaming of the separated and collected liquid.

Even in light of the cyclone disclosed in JP 2008-000665 A above, there is still room for various improvements with respect to the structure for suppressing liquid foaming.

SUMMARY

Thus, one of the objects of the present disclosure is to provide a separation device capable of suppressing liquid foaming more effectively.

According to an embodiment of the present disclosure, a separation device comprises a cyclone extending along a central axis, including an introduction port for introducing a liquid containing foreign matter into an interior and a first discharge port provided at a lower end for discharging the foreign matter, and separating the foreign matter from the liquid by centrifugal force by swirling the liquid in the interior, a columnar air layer formed in a manner extending from the first discharge port along the central axis, and the liquid from which the foreign matter is separated rising along an outer circumferential surface of the air layer, a clean case provided on an opposite side of the first discharge port in an extending direction of the cyclone, including a barrier wall on which a connecting hole is provided at an upper end of the cyclone and a second discharge port, and connected to the interior by the connecting hole, a gas-liquid separation tube provided in the clean case, extending from the connecting hole along the central axis, and including a plurality of first holes, and an inner wall provided in the clean case, extending along the central axis, surrounding the gas-liquid separating tube, and including a plurality of second holes.

The liquid from which the foreign matter is separated that rises along the air layer from the first discharge port to the gas-liquid separation tube passes through the plurality of first holes and the plurality of second holes and is discharged from the second discharge port to outside the clean case.

According to the present disclosure, it is possible to provide a separation device capable of suppressing liquid foaming more effectively.

Additional objects and advantages of the disclosure will be set forth in the description which follows, and in part will be obvious from the description, or may be learned by practice of the disclosure. The objects and advantages of the disclosure may be realized and obtained by means of the instrumentalities and combinations particularly pointed out hereinafter.

DRAWINGS

The accompanying drawings, which are incorporated in and constitute a part of the specification, illustrate embodiments of the disclosure, and together with the general description given above and the detailed description of the embodiments given below, serve to explain the principles of the disclosure.

DETAILED DESCRIPTION

Figure 1:
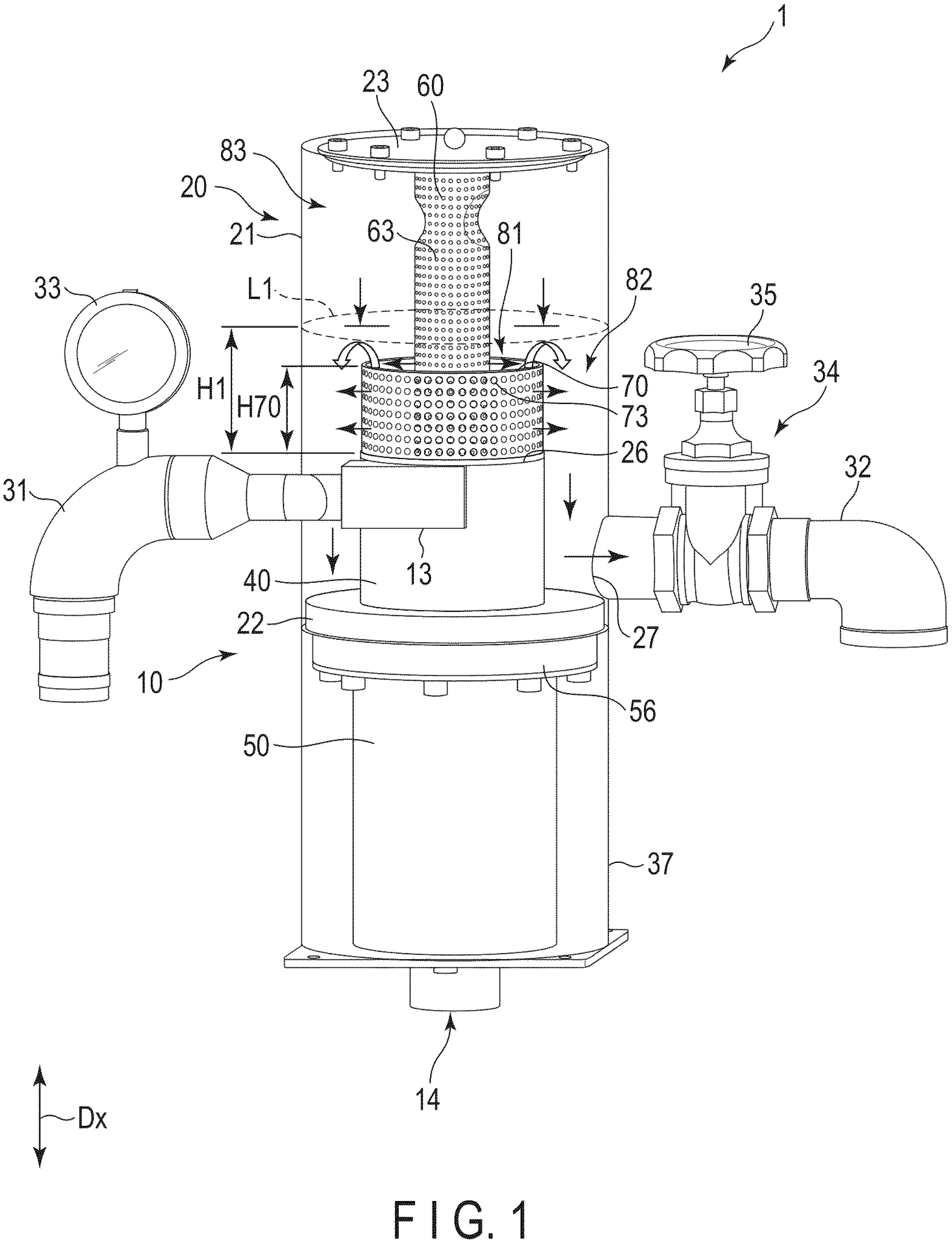
FIG. 1 is a schematic perspective view of a separation device according to one embodiment according to the teachings of the present disclosure.

An embodiment of the separation device will be described hereinafter with reference to the accompanying drawings. The disclosure is merely an example, and proper changes within the spirit of the disclosure, which are easily conceivable by a skilled person, are included in the scope of the disclosure as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

In the present embodiment, a separation device for separating and removing foreign matter contained in a liquid by centrifugal force is disclosed. The liquid includes, for example, grinding fluid, cutting fluid, and coolant. The foreign matter includes, for example, chips of metal materials and metal powder.

Figure 2:
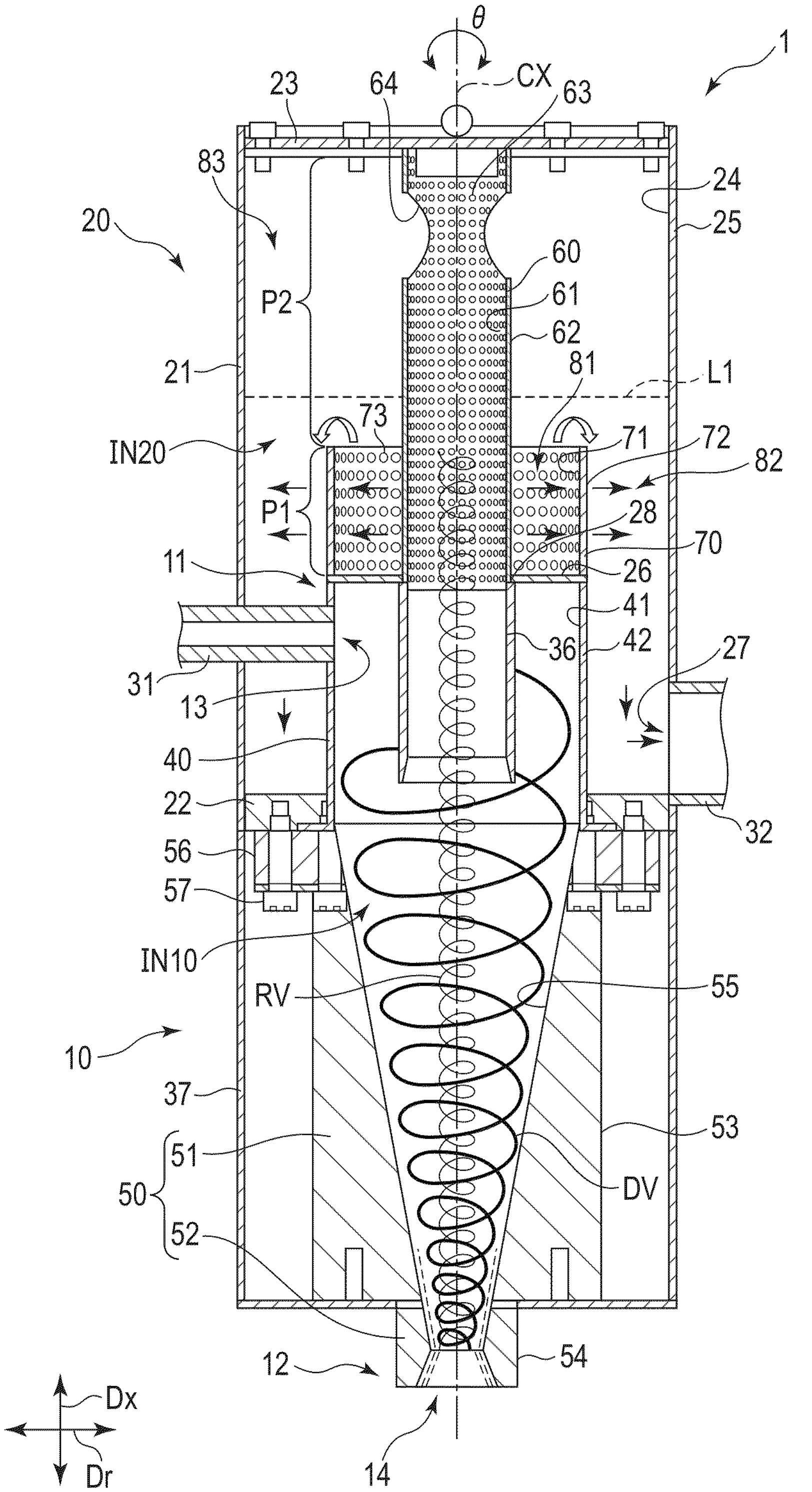
FIG. 2 is a schematic cross-sectional view of the separation device shown in FIG. 1.
Figure 3:
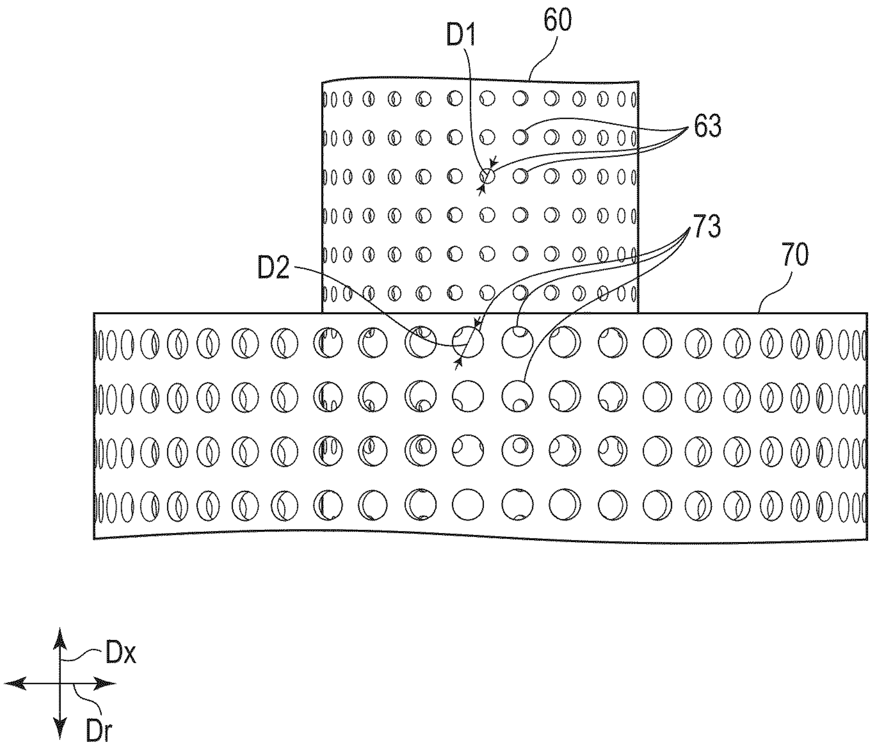
FIG. 3 is a schematic partially enlarged view of a gas-liquid separation tube and an inner wall of the separation device of FIG. 1.
Figure 4:
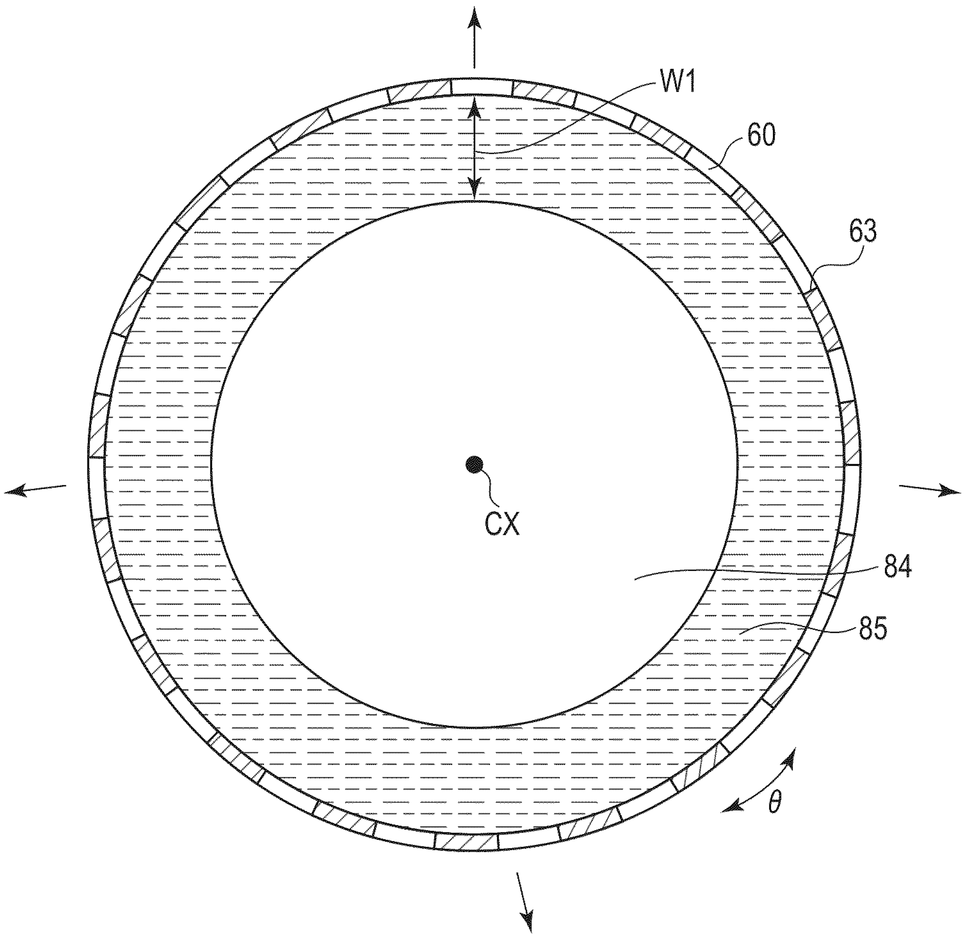
FIG. 4 is a schematic cross-sectional view of the gas-liquid separation tube shown along line IV-IV in FIG. 1.

FIG. 1 is a schematic perspective view of a separation device 1 according to the present embodiment. FIG. 2 is a schematic cross-sectional view of the separation device 1 shown in FIG. 1. FIG. 3 is a schematic partially enlarged view of a gas-liquid separation tube 60 and an inner wall 70 provided in the separation device 1. FIG. 4 is a schematic cross-sectional view of the gas-liquid separation tube 60 shown along line IV-IV in FIG. 1. In FIG. 1, some of the parts are shown transparent for convenience of illustration. In FIG. 1 and FIG. 2, the flow of liquid in the separation device 1 is indicated by arrows.

As shown in FIG. 1 and FIG. 2, the separation device 1 has a cyclone 10, a clean case 20, an introduction pipe 31, and a discharge pipe 32. The cyclone 10 extends along a central axis CX.

Here, a parallel direction along the central axis CX is defined as an axial direction Dx. One side of the axial direction Dx is defined as up or above, and the other side of the axial direction Dx is defined as down or beneath. The extending direction of the cyclone 10 corresponds to the axial direction Dx. A direction away from the central axis CX with the central axis CX as the center is defined as a radial direction Dr, and a circumferential direction θ around the central axis CX is defined.

The cyclone 10 has an introduction portion 40 and a drain portion 50 connected to the introduction portion 40. The introduction portion 40 is located at an upper end side of the cyclone 10, and the drain portion 50 is located at a lower end side of the cyclone 10. The cyclone 10 has an end portion 11 and an end portion 12 on an opposite side of the end portion 11. The end portion 11 corresponds to an upper end of the cyclone 10, and the end portion 12 corresponds to a lower end of the cyclone 10.

The introduction portion 40 is formed cylindrically. The introduction portion 40 has an inner circumferential surface 41 located on an inner side of the radial direction Dr and an outer circumferential surface 42 located on an outer side of the radial direction Dr. The inner circumferential surface 41 and the outer circumferential surface 42 extend with a uniform diameter along the axial direction Dx.

The drain portion 50 is located coaxially with the introduction portion 40. The drain portion 50 has a columnar first member 51 connected to the introduction portion 40 and a columnar second member 52 connected to the first member 51. The first member 51 and the second member 52 have outer circumferential surfaces 53 and 54 located on the outer side of the radial direction Dr, respectively. The outer circumferential surfaces 53 and 54 extend with a uniform diameter along the axial direction Dx. The outer diameter of the first member 51 is larger than the outer diameter of the second member 52.

The drain portion 50 has an inner circumferential surface 55 formed from the first member 51 to the second member 52. The inner circumferential surface 55 is connected to the lower end side of the inner circumferential surface 41 in the circumferential direction θ. The inner circumferential surface 55 is formed in a conical surface shape extending from the connection point with the inner circumferential surface 41 toward the lower end of the cyclone 10. The inner circumferential surface 55 has a gradually decreasing inner diameter toward the lower end of the cyclone 10. An area enclosed by the inner circumferential surface 41 and the inner circumferential surface 55 is hereinafter referred to as an “interior IN10 of the cyclone 10”.

The end portion of the first member 51 on the introduction portion 40 side is provided with a flange 56 protruding in the radial direction Dr from the outer circumferential surface 53. In the example shown in FIG. 2, the cyclone 10 is connected to a bottom wall of the clean case 20 described below via the flange 56 by a fixing member 57 such as a bolt.

The cyclone 10 further has an introduction port 13 and a first discharge port 14. The introduction port 13 introduces a liquid containing foreign matter into the interior IN10 of the cyclone 10. The introduction port 13 is provided in the introduction portion 40. In the example shown in FIG. 2, the introduction port 13 is provided on the end portion 11 side of the introduction portion 40. The introduction port 13 is open along a tangential direction of the cylindrically formed introduction portion 40.

The introduction pipe 31 is connected to the introduction port 13. Liquid containing foreign matter flows into the introduction pipe 31. The introduction pipe 31 connects the interior IN10 of the cyclone 10 and the exterior of the cyclone 10 via the introduction port 13. The liquid introduced from the introduction pipe 31 to the introduction port 13 is supplied to the interior of the introduction portion 40 along the tangential direction of the introduction portion 40. In the example shown in FIG. 1, a pressure gauge 33 is provided on the introduction pipe 31. The pressure gauge 33 may be, for example, a pressure sensor.

The first discharge port 14 discharges the liquid containing a large amount of foreign matter separated from the liquid from the interior IN10 of the cyclone 10 to the exterior of the cyclone 10. The first discharge port 14 connects the interior IN10 of the cyclone 10 and the exterior of the cyclone 10. The first discharge port 14 is provided at the end portion 12 of the cyclone 10.

More specifically, the first discharge port 14 is provided at an end portion of the second member 52 on the lower end side, extending along the axial direction Dx. In the example shown in FIG. 2, the inner circumferential surface of the first discharge port 14 is formed in a conical surface shape with the inner diameter gradually increasing from the connection point with the inner circumferential surface 55 toward the lower end of the cyclone 10.

The clean case 20 stores therein a liquid from which foreign matter has been separated by the cyclone 10. As shown in FIG. 1 and FIG. 2, the clean case 20 is located on the upper end side of the cyclone 10. From another perspective, in the separation device 1, the clean case 20 is provided on the opposite side of the first discharge port 14 in the axial direction Dx.

The clean case 20 has a side wall 21, a bottom wall 22, and an upper wall 23 on the opposite side of the bottom wall 22 in the axial direction Dx. The bottom wall 22 and the upper wall 23 are connected to the side wall 21. An area enclosed by the side wall 21, the bottom wall 22, and the upper wall 23 is hereinafter referred to as an "interior IN20 of the clean case 20". Liquid is stored in the interior IN20 of the clean case 20. In the example shown in FIG. 1 and FIG. 2, the introduction portion 40 is located in the interior IN20 of the clean case 20.

The side wall 21 is formed cylindrically around a central axis CX. The side wall 21 has an inner circumferential surface 24 located on the inner side of the radial direction Dr and an outer circumferential surface 25 located on the outer side of the radial direction Dr. The inner circumferential surface 24 and the outer circumferential surface 25 extend with a uniform diameter along the axial direction Dx. The bottom wall 22 and the upper wall 23 are disk-shaped around the central axis CX. The upper wall 23 is provided removably with respect to the side wall 21, for example.

The clean case 20 further comprises a barrier wall 26 and a second discharge port 27. The barrier wall 26 separates the interior IN10 of the cyclone 10 from the interior IN20 of the clean case 20. The barrier wall 26 is provided at the end portion 11. The barrier wall 26 is disk-shaped around the central axis CX. In the examples shown in FIG. 1 and FIG. 2, the outer diameter of the barrier wall 26 is approximately equal to the outer diameter of the introduction portion 40.

The barrier wall 26 is provided with a connecting hole 28 centered on the central axis CX. The connecting hole 28 connects the interior IN10 of the cyclone 10 to the interior IN20 of the clean case 20. The connecting hole 28 has a circular shape and is centered on the central axis CX.

The second discharge port 27 discharges a liquid from which foreign matter has been separated from the interior IN20 of the clean case 20 to the exterior of the clean case 20. The second discharge port 27 is provided on the side wall 21. The discharge pipe 32 is connected to the second discharge port 27. The discharge pipe 32 connects the interior IN20 of the clean case 20 and the exterior of the clean case 20 via the second discharge port 27. The clean case 20 is formed so that no liquid flows out of the interior IN20 of the clean case 20, except through the second discharge port 27.

A liquid collection tank (not shown) is provided outside the clean case 20 for storing liquid discharged from the second discharge port 27, for example. The discharge pipe 32 extends toward the liquid collection tank.

In the example shown in FIG. 1, the discharge pipe 32 is provided with a valve 34. The valve 34 adjusts the flow rate discharged from the discharge pipe 32 by adjusting the degree of opening. Furthermore, the valve 34 adjusts the amount of liquid stored in the interior IN20 of the clean case 20.

From another perspective, the valve 34 adjusts the height of the liquid level in the interior IN20 of clean case 20. Providing the valve 34 facilitates the adjustment of the height of the liquid level. The degree of opening the valve 34 is adjusted, for example, by operating a handle 35 provided on the valve 34. The valve 34 is, for example, a dividing valve.

The separation device 1 further comprises a connecting tube 36, a gas-liquid separation tube 60, and an inner wall 70 surrounding the gas-liquid separation tube 60. The connecting tube 36 is provided coaxially with the central axis CX inside the introduction portion 40. The connecting tube 36 is formed cylindrically. The connecting tube 36 extends in the axial direction Dx from the connecting hole 28 toward the first discharge port 14.

The connecting tube 36 connects the interior IN10 of the cyclone 10 and the interior IN20 of the clean case 20 via the connecting hole 28. In the example shown in FIG. 2, the connecting tube 36 does not extend to the drain portion 50. From another perspective, the length of the connecting tube 36 is shorter than the length of the introduction portion 40.

The gas-liquid separation tube 60 is provided coaxially with the central axis CX in the interior IN20 of the clean case 20. The gas-liquid separation tube 60 is formed cylindrically. The gas-liquid separation tube 60 extends from the connecting hole 28 along the axial direction Dx toward the upper wall 23. In the example shown in FIG. 2, one end of the gas-liquid separation tube 60 is connected to the connecting tube 36, and the other end of the gas-liquid separation tube 60 is in contact with the upper wall 23.

The gas-liquid separation tube 60 has an inner circumferential surface 61 located on the inner side of the radial direction Dr and an outer circumferential surface 62 located on the outer side of the radial direction Dr. The inner circumferential surface 61 and outer circumferential surface 62 extend with a uniform diameter along the axial direction Dx. The interior of the gas-liquid separation tube 60 is connected to the interior of the connecting tube 36. In the example shown in FIG. 2, the inner diameter of the gas-liquid separation tube 60 is approximately equal to the inner diameter of the connecting tube 36.

The gas-liquid separation tube 60 has a plurality of first holes 63. The plurality of first holes 63 are provided throughout the gas-liquid separation tube 60, for example. In the example shown in FIG. 3, the plurality of first holes 63 are provided at uniform intervals in the axial direction Dx and the circumferential direction θ, respectively. The first holes 63 are through holes that penetrate the inner circumferential surface 61 and the outer circumferential surface 62. The shape of the first hole 63 is, for example, circular.

The inner wall 70 is provided coaxially with the central axis CX so as to enclose the gas-liquid separation tube 60 in the interior IN20 of the clean case 20 from the outer side of the radial direction Dr. The inner wall 70 is formed cylindrically. In the example shown in FIG. 2, the outer diameter of the inner wall 70 is approximately equal to the outer diameter of the introduction portion 40.

The inner wall 70 extends along the axial direction Dx from the barrier wall 26 toward the upper wall 23. The inner wall 70 has an inner circumferential surface 71 located on the inner side of the radial direction Dr and an outer circumferential surface 72 located on the outer side of the radial direction Dr. The inner circumferential surface 71 and the outer circumferential surface 72 extend with a uniform diameter along the axial direction Dx.

The inner wall 70 surrounds a portion of the gas-liquid separation tube 60 located on the upper end side of the cyclone 10 for the entire circumferential direction θ. The inner diameter of the inner wall 70 is larger than the outer diameter of the gas-liquid separation tube 60 and smaller than the inner diameter of the side wall 21.

In the example shown in FIG. 2, the length from the outer circumferential surface 62 of the gas-liquid separation tube 60 to the inner circumferential surface 71 of the inner wall 70 in the radial direction Dr is approximately equal to the length from the inner circumferential surface 24 of the side wall 21 to the outer circumferential surface 72 of the inner wall 70. The length from the outer circumferential surface 62 of gas-liquid separation tube 60 to the inner circumferential surface 71 of the inner wall 70 may be larger or smaller than the length from the inner circumferential surface 24 of the side wall 21 to the outer circumferential surface 72 of the inner wall 70.

For example, in the axial direction Dx, an area of the gas-liquid separation tube 60 enclosed by the inner wall 70 is smaller than an area of the gas-liquid separation tube 60 not enclosed by the inner wall 70. In FIG. 2, the area of the gas-liquid separation tube 60 enclosed by the inner wall 70 is shown as area P1, and the area of the gas-liquid separation tube 60 not enclosed by the inner wall 70 is shown as area P2. For example, the length of the area P1 of the gas-liquid separation tube 60 enclosed by the inner wall 70 in the axial direction Dx is smaller than one-half the length of the gas-liquid separation tube 60 in the axial direction Dx.

The inner wall 70 has a plurality of second holes 73. The plurality of second holes 73 are provided, for example, throughout the inner wall 70. In the example shown in FIG. 3, the plurality of second holes 73 are provided at uniform intervals in the axial direction Dx and the circumferential direction θ, respectively. The second holes 73 are through holes that penetrate the inner circumferential surface 71 and the outer circumferential surface 72. The shape of the second hole 73 is, for example, circular.

As shown in FIG. 3, the size of the plurality of second holes 73 is larger than the size of the plurality of first holes 63. From another perspective, the aperture ratio of the inner wall 70 is larger than the aperture ratio of the gas-liquid separation tube 60. Here, "size" corresponds to the opening area of the first hole 63 and the second hole 73, and "aperture ratio" is the ratio of the total opening area to the unit area.

For example, a diameter D1 of the first hole 63 is 1 to 2 mm, and a diameter D2 of the second hole 73 is 3 to 5 mm, for example. In one example, the diameter D1 of the first hole 63 is 1 mm and the diameter D2 of the second hole 73 is 3 mm, for example. The gas-liquid separation tube 60 and the inner wall 70 can be formed by a perforated plate having a number of holes, such as a punching plate.

The side wall 21 surrounds the inner wall 70 and the introduction portion 40 from the outer side of the radial direction Dr. The bottom wall 22 is located between the first discharge port 14 and the barrier wall 26 in the axial direction Dx. In the example shown in FIG. 2, the bottom wall 22 is located at the end portion of the introduction portion 40 on the drain portion 50 side in the axial direction Dx.

The second discharge port 27 is located between the bottom wall 22 and the barrier wall 26 in the axial direction Dx. The second discharge port 27 is open facing the outer circumferential surface 42 of the introduction portion 40 on the drain portion 50 side in the radial direction Dr. From another perspective, the second discharge port 27 is located between the bottom wall 22 and the introduction port 13 in the axial direction Dx. In the example shown in FIG. 2, one end of the second discharge port 27 on the lower end side of the cyclone 10 is provided overlapping the upper surface of the bottom wall 22 in the radial direction Dr.

In the interior IN20 of the clean case 20, a first storage portion 81 is formed between the gas-liquid separation tube 60 and the inner wall 70, and a second storage portion 82 is formed between the introduction portion 40 and the side wall 21 and between the inner wall 70 and the side wall 21. From another perspective, the second storage portion 82 surrounds the first storage portion 81 in the circumferential direction θ.

The volume of the second storage portion 82 is larger than the volume of the first storage portion 81, for example. From another perspective, the length of the second storage portion 82 in the axial direction Dx is longer than the length of the first storage portion 81 in the axial direction Dx.

As shown in FIG. 2, the gas-liquid separation tube 60 is provided with a relief hole 64. The relief hole 64 discharges the liquid that flows into the gas-liquid separation tube 60 to the interior IN20 of the clean case 20 when the plurality of first holes 63 are closed by foreign matter. A plurality (e.g., two) of relief holes 64 are provided above the gas-liquid separation tube 60. The relief holes 64 are larger than the first hole 63 and are not enclosed by the inner wall 70.

The separation device 1 further comprises a cover 37 that encloses the first member 51 of the drain portion 50 from the outer side of the radial direction Dr. The cover 37 is cylindrically formed around the central axis CX. The cover 37 extends with a uniform diameter along the axial direction Dx. The outer diameter of the cover 37 may, for example, be approximately equal to the outer diameter of the side wall 21 or smaller than the outer diameter of the side wall 21. Below the first discharge port 14 is provided a foreign matter collection tank (not shown) for storing, for example, foreign matter or liquid discharged from the first discharge port 14.

Next, the process of separating and removing foreign matter from liquids containing foreign matter in the separation device 1 will be described.

First, a liquid containing foreign matter is introduced into the interior IN10 of the cyclone 10 from the introduction port 13 via the introduction pipe 31. The liquid is fed at a predetermined flow velocity in the tangential direction of the introduction portion 40. The supplied liquid descends toward the first discharge port 14 while swirling along the inner circumferential surface 41 of the introduction portion 40 and the inner circumferential surface 55 of the drain portion 50.

This generates a downward vortex flow centered on the central axis CX in the interior IN10 of the cyclone 10. In FIG. 2, the downward vortex flow is indicated by a vortex flow DV. Foreign matter contained in the liquid is separated by centrifugal force based on the downward vortex flow in the interior IN10 of the cyclone 10.

The separated foreign matter collects on the inner circumferential surface 55 of the drain portion 50 and descends while swirling along the inner circumferential surface 55 of the drain portion 50. The foreign matter, for example, becomes sludge and is discharged with a small amount of liquid from the first discharge port 14. The discharged foreign matter and liquid are collected in the foreign matter collection tank.

The downward vortex flow that descends along the inner circumferential surface 55 of the drain portion 50 receives an upward force near the first discharge port 14 and turns upward. This creates an upward vortex flow along the central axis CX of the cyclone 10 from the first discharge port 14 to the clean case 20. In FIG. 2, the upward vortex flow is indicated by a vortex flow RV.

As shown in FIG. 4, the upward vortex flow includes a columnar air layer 84 centered on the central axis CX and a liquid layer 85 formed around the air layer 84. A vacuum portion is formed in the central portion of the air layer 84. The air layer 84 extends from the first discharge port 14 along the axial direction Dx through the connecting tube 36 toward the gas-liquid separation tube 60. The liquid layer 85 is formed by the liquid from which foreign matter is separated rising along the outer circumferential surface of the air layer 84 from the first discharge port 14 toward the gas-liquid separation tube 60.

As the upward vortex flow flows into the gas-liquid separation tube 60, the liquid from which foreign matter is separated rises along the air layer 84 from the first discharge port 14 to the gas-liquid separation tube 60. The liquid flows from the liquid layer 85 located on a surface layer portion of the upward vortex flow through the plurality of first holes 63 in the gas-liquid separation tube 60 to the first storage portion 81. The liquid flowing into the first storage portion 81 flows through the plurality of second holes 73 in the inner wall 70 to the second storage portion 82.

A part of the liquid flowing into the first storage portion 81 flows over the inner wall 70 to the second storage portion 82. From another perspective, a part of the liquid that flows into the first storage portion 81 overflows into the second storage portion 82. When the separation device 1 is in operation, two flows of liquid are formed in the interior IN20 of the clean case 20 from the first storage portion 81 to the second storage portion 82.

By adjusting the size of the second hole 73, the flow rate that passes through the plurality of second holes and the flow rate that overflows can be adjusted. The flow rate through the plurality of second holes 73 is greater than the flow rate that overflows, for example. From another perspective, the size of the plurality of second holes can suppress the flow rate that overflows.

The liquid flowing in from the gas-liquid separation tube 60 is temporarily stored mainly in the first storage portion 81 and the second storage portion 82. Since foreign matter is separated from the liquid in the interior IN10 of the cyclone 10, the liquid stored in the clean case 20 contains almost no foreign matter. A liquid surface is formed in the interior IN20 of the clean case 20 by the stored liquid. In FIG. 1 and FIG. 2, the liquid surface is shown as liquid surface L1.

In the interior IN20 of the clean case 20, an air puddle 83 is formed above the liquid surface L1. The liquid stored in the second storage portion 82 is discharged from the second discharge port 27 to the liquid collection tank via the discharge pipe 32.

When the separation device 1 is in operation, the gas-liquid separation tube 60 and the inner wall 70 are immersed in liquid. For example, the liquid surface L1 is located on the cyclone 10 side than the center of the gas-liquid separation tube 60 in the axial direction Dx. The length of the area of the gas-liquid separation tube 60 immersed in the liquid in the axial direction Dx is smaller than the length of the area of the gas-liquid separation tube 60 not immersed in the liquid in the axial direction Dx, for example.

When the separation device 1 is in operation, the entire inner wall 70 is immersed in liquid. As shown in FIG. 1, the inner wall 70 is designed to be below the liquid surface L1 when the separation device 1 is in operation.

From another perspective, the inner wall 70 is located on the cyclone 10 side rather than on the liquid surface L1 side when the separation device 1 is in operation. As shown in FIG. 1, in the axial direction Dx, a length H1 from the barrier wall 26 to the liquid surface L1 is longer than a length H70 of the inner wall 70.

Figure 5:
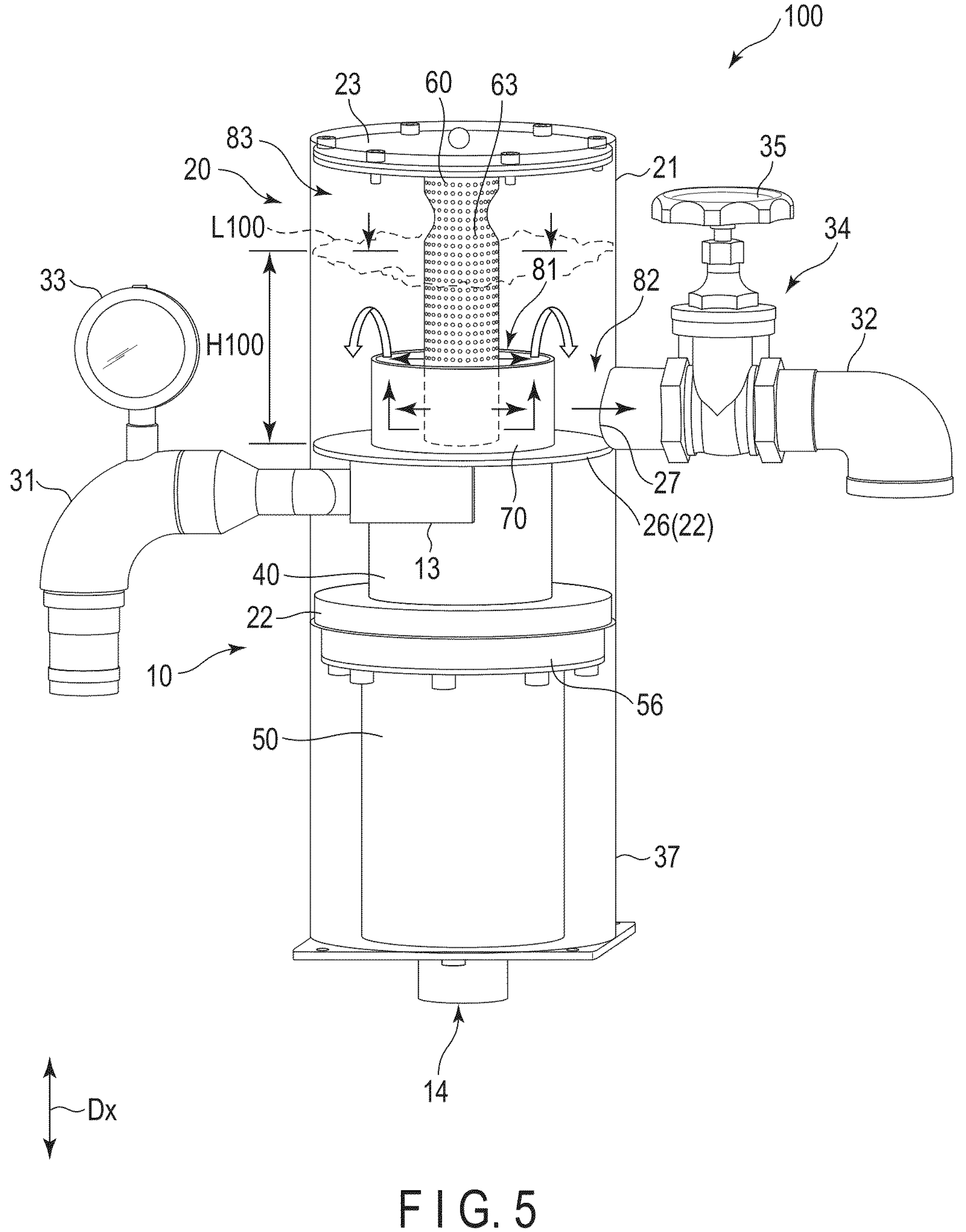
FIG. 5 shows a comparative example of the separation device shown in FIG. 1 according to the teachings of the present disclosure.
Figure 6:
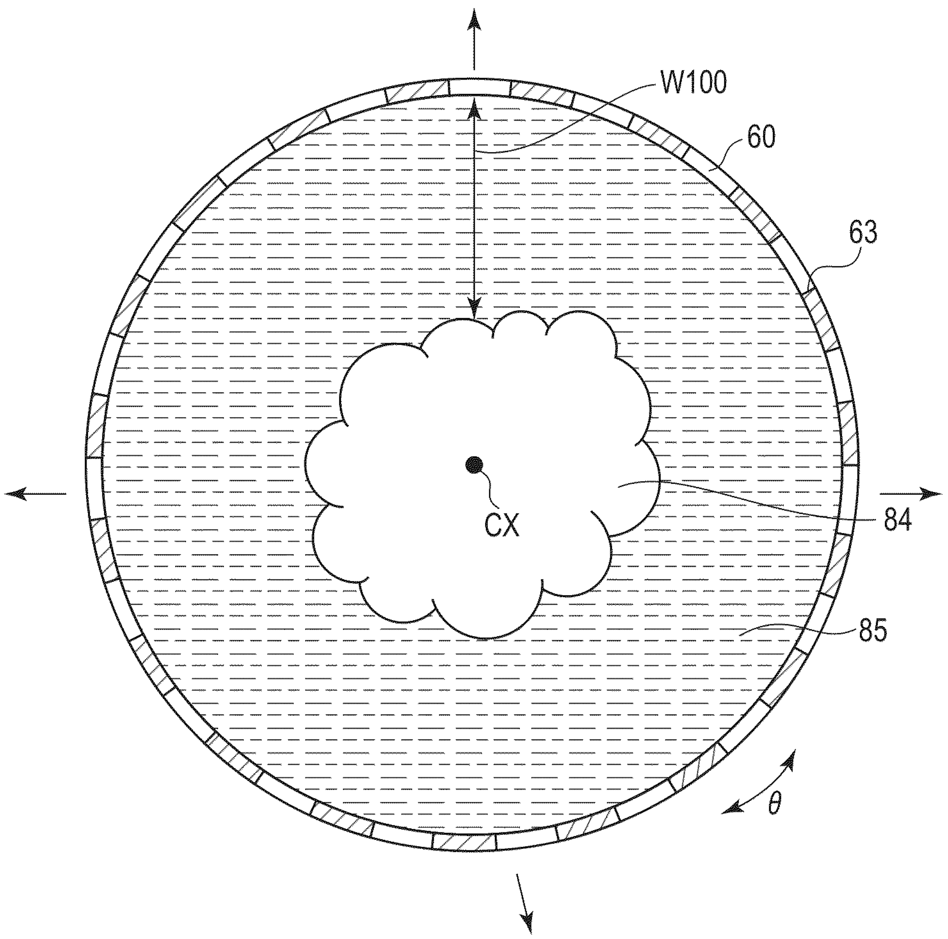
FIG. 6 is a schematic cross-sectional view of a gas-liquid separation tube shown along line VI-VI in FIG. 5.

Here, a comparative example of the separation device 1 of the present embodiment is shown. FIG. 5 shows a comparative example of the separation device 1 shown in FIG. 1. FIG. 6 is a schematic cross-sectional view of a gas-liquid separation tube 60 shown along line VI-VI in FIG. 5. In FIG. 5, some of the parts are shown transparent for convenience of explanation.

As shown in FIG. 5, an inner wall 70 provided by a separation device 100 does not have a second hole 73. In an axial direction Dx, a bottom wall 22 is in the same position as a barrier wall 26. In the example shown in FIG. 5, the bottom wall 22 is formed integrally with the barrier wall 26.

The bottom wall 22 is formed more upward in the axial direction Dx compared to FIG. 1. Therefore, a second discharge port 27 faces the inner wall 70. The second discharge port 27 is formed more upwardly in the axial direction Dx compared to FIG. 1.

In the separation device 100, when an upward vortex flow flows into the gas-liquid separation tube 60, liquid flows from a liquid layer 85 located in the surface layer portion of the upward vortex flow through a plurality of first holes 63 in the gas-liquid separation tube 60 to a first storage portion 81. The liquid flowing into the first storage portion 81 collides with the inner wall 70. A part of the liquid collides with the inner wall 70 and flows along the inner circumferential surface of the inner wall 70 in the axial direction Dx.

The liquid then flows over the inner wall 70 to a second storage portion 82. When the separation device 100 is in operation, one flow of liquid is formed in an interior IN20 of a clean case 20, flowing from the first storage portion 81 to the second storage portion 82 over the inner wall 70.

When the separation device 100 is in operation, since the liquid flows from the first storage portion 81 to the second storage portion 82 over the inner wall 70, the liquid surface tends to wobble and be unstable. The expression "liquid surface wobbles" means that the liquid surface moves in the axial direction Dx, or that the liquid level undulates, etc.

In FIG. 5, the liquid surface is shown as a liquid surface L100. When the liquid surface L100 wobbles, the liquid tends to entrap air from an air puddle 83, and the liquid tends to foam in the interior IN20 of the clean case 20. The wobbling liquid surface L100 makes it difficult to adjust the location of the liquid surface L100 in the axial direction Dx by a valve 34.

If the liquid surface L100 is unstable, the flow rate from the gas-liquid separation tube 60 to the interior IN20 of the clean case 20 is unstable. As a result, the flow of liquid forming the liquid layer 85 of the upward vortex flow becomes less stable.

Therefore, a thickness W100 of the liquid layer 85 is not uniform in a circumferential direction θ, as shown in FIG. 6. The thickness W100 of the liquid layer 85 becomes larger in comparison to FIG. 4. Furthermore, in a case where the upward vortex flow is not formed stably, it may cause separation accuracy of foreign matter from the liquid in an interior IN10 of the cyclone 10 to decrease. Separation accuracy may also be referred to as filtration accuracy.

In the axial direction Dx, since the bottom wall 22 is at the same position as the barrier wall 26, the liquid surface L100 is higher in comparison to FIG. 1. From another perspective, a length H100 from the barrier wall 26 to the liquid surface L100 is longer than the length H1 from the barrier wall 26 to the liquid surface L1 shown in FIG. 1. Furthermore, since the second discharge port 27 is closer to the liquid surface L100, when the liquid surface L100 drops, air is more likely to be entrained when liquid is discharged from the second discharge port 27.

The separation device 1 of the present embodiment that is configured as described above comprises the inner wall 70 that surrounds the gas-liquid separation tube 60 and has a plurality of second holes 73. By forming a plurality of second holes 73 in the inner wall 70, a flow of liquid flowing from the first storage portion 81 through the plurality of second holes 73 to the second storage portion 82 can be formed for the separation device 1.

Two flows of liquid are formed in the interior IN20 of the clean case 20 from the first storage portion 81 to the second storage portion 82. By suppressing the momentum of the liquid when passing through the plurality of second holes 73, the liquid can smoothly flow from the first storage portion 81 to the second storage portion 82.

By forming a plurality of second holes 73 on the inner wall 70, the liquid flowing into the first storage portion 81 is less likely to collide with the inner circumferential surface 71 of the inner wall 70. This can suppress the flow of liquid along the inner circumferential surface 71 of the inner wall 70 in the axial direction Dx.

As a result, the liquid surface L1 is less likely to wobble and more likely to be stable. By stabilizing the liquid surface L1, the liquid is less likely to entrain air from the air puddle 83, and foaming of the liquid in the interior IN20 of the clean case 20 can be effectively suppressed. Therefore, the separation device 1 can suppress foaming of the liquid more effectively in comparison to the separation device 100 shown in FIG. 5.

From the separation device 1, liquid containing almost no bubbles can be discharged from the discharge pipe 32 to the outside of the clean case 20. With the separation device 1 of the present embodiment, there is no need to use a defoaming agent, etc., and foaming of the liquid can be suppressed.

Furthermore, by making the size of the plurality of second holes 73 larger than the size of the plurality of first holes 63, the flow rate through the plurality of second holes 73 can be made larger than the flow rate that overflows.

This makes the liquid surface L1 more stable because the liquid flowing into the first storage portion 81 can reduce the momentum of the liquid and allow the liquid to flow primarily to the second storage portion. By forming a flow that passes through the plurality of second holes 73 and a flow that overflows, it is possible to suppress the momentum of the liquid to the second storage portion 82 and to more effectively suppress foaming of the liquid.

By stabilizing the liquid surface L1, the flow rate from the gas-liquid separation tube 60 to the interior IN20 of the clean case 20 is stabilized. Furthermore, by stabilizing the liquid surface L1, the liquid surface L1 can be set at a low position. By setting the liquid surface L1 at a low position, the area P1 enclosed by the inner wall 70 of the gas-liquid separation tube 60 can be made smaller than the area P2 not enclosed by the inner wall 70 of the gas-liquid separation tube 60.

As a result, the flow of liquid inside the gas-liquid separation tube 60 is less obstructed and the flow of liquid forming the liquid layer 85 is stabilized. As shown in FIG. 4, the thickness W1 of the liquid layer 85 tends to be uniform in the circumferential direction θ.

Furthermore, the thickness W1 of the liquid layer 85 can be made thinner than the thickness W100 shown in FIG. 6. By stably forming the upward vortex flow, the flow velocity of the downward vortex flow in the interior IN10 of the cyclone 10 is stabilized, and the separation accuracy of foreign matter from the liquid in the interior IN10 of the cyclone 10 is improved.

By stabilizing the liquid surface L1, it becomes easier to adjust the position of the liquid surface L1 in the axial direction Dx by the valve 34. Furthermore, by stabilizing the liquid surface L1, a portion corresponding to the air puddle 83 in the interior IN20 of the clean case 20 can be made smaller, which shortens the length of the clean case 20 in the axial direction Dx and makes the separation device 1 more compact.

In the separation device 1 of the present embodiment, the bottom wall 22 of the clean case 20 is located between the first discharge port 14 and the barrier wall 26 in the axial direction Dx. Therefore, the second discharge port 27 can be set lower than the barrier wall 26. By positioning the second discharge port 27 between the bottom wall 22 and the barrier wall 26 in the axial direction Dx, the second discharge port 27 can be opened to face the outer circumferential surface 42 of the introduction portion 40.

This prevents the liquid passing through the second hole 73 from flowing directly along the radial direction Dr to the second discharge port 27. As a result, air entrapment is prevented when the liquid flows directly to the second discharge port 27.

Furthermore, since the second discharge port 27 can be set further away from the liquid surface L1, air entrapment is prevented when the liquid surface L1 drops, and foaming of the liquid can be suppressed. By setting the second discharge port 27 away from the liquid surface L1, it is possible to secure time for air bubbles to escape from the liquid stored in the interior IN20 of the clean case 20. This allows more bubble-free liquid to be discharged from the discharge pipe 32 to the outside of the clean case 20.

According to the present embodiment, it is possible to provide a separation device 1 that can more effectively suppress foaming of the liquid. In addition to the above, various other suitable effects can be obtained from the present embodiment.

Figure 7:
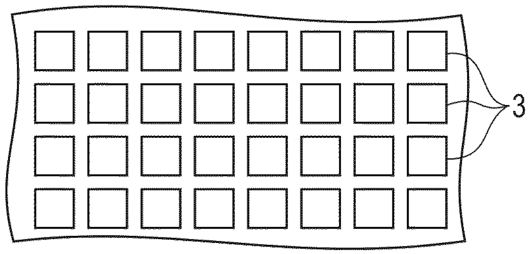
FIG. 7 illustrates other examples of holes applicable to a first hole and a second hole according to the teachings of the present disclosure.
Figure 8:
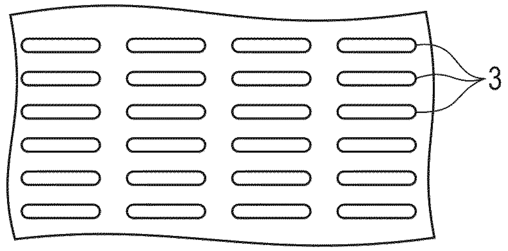
FIG. 8 illustrates yet another example of holes applicable to the first hole and the second hole according to the teachings of the present disclosure.
Figure 9:
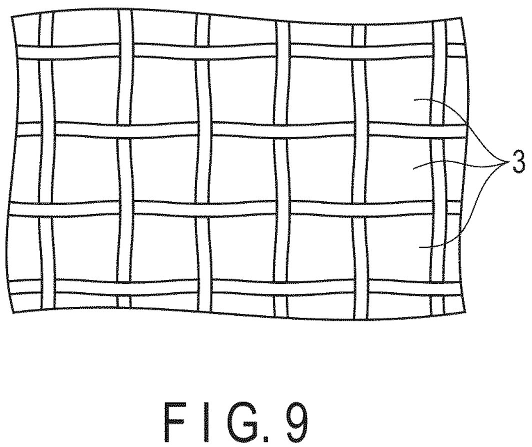
FIG. 9 illustrates yet another example of holes applicable to the first hole and the second hole according to the teachings of the present disclosure.

The configuration of the separation device 1 according to the embodiment described above is only one example. Modifications are shown below for the first hole 63 and the second hole 73. FIG. 7 to FIG. 9 illustrate examples of holes applicable to the first hole 63 and the second hole 73. Hereafter, the first hole 63 and the second hole 73 are collectively referred to as "hole 3".

As shown in FIG. 7, the shape of the hole 3 can be a rectangle. As an example, the shape of the hole 3 is a rectangle, square, rhombus, etc. As yet another example, as shown in FIG. 8, the shape of the hole 3 may be a long hole such as a slit. In the example shown in FIG. 8, the hole 3 is a long hole extending in the circumferential direction θ, but it can also be a long hole extending in the axial direction Dx.

As yet another example, as shown in FIG. 9, the hole 3 may be formed in a mesh shape. The gas-liquid separation tube 60 and the inner wall 70 can be formed, for example, by a mesh sheet. The hole 3 may include notches. The shapes of holes as described above can be applied to the first holes 63 and the second holes 73, respectively, in which the first holes 63 and the second holes 73 may have the same or different shapes.

Note that the size of all first holes 63 may be the same or different. The size of all second holes 73 may be the same or different. Note that the intervals of the first holes 63 and the second holes 73 in the axial direction Dx may be equal to or different from the intervals in the circumferential direction θ. Each part of the separation device 1 can be formed of a metallic material, for example. However, the separation device 1 may also include components formed of non-metallic materials such as resin.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A separation device comprising:

a cyclone extending along a central axis, including an introduction portion in which an introduction port for introducing a liquid containing foreign matter into an interior is provided and a first discharge port provided at a lower end for discharging the foreign matter, and separating the foreign matter from the liquid by centrifugal force by swirling the liquid in the interior, a columnar air layer formed in a manner extending from the first discharge port along the central axis, and the liquid from which the foreign matter is separated rising along an outer circumferential surface of the air layer;

a clean case provided on an opposite side of the first discharge port in an extending direction of the cyclone, including a barrier wall on which a connecting hole is provided at an upper end of the cyclone and a second discharge port, and connected to the interior by the connecting hole;

a gas-liquid separation tube provided in the clean case, extending from the connecting hole along the central axis, and including a plurality of first holes; and an inner wall provided in the clean case, extending along the central axis, surrounding the gas-liquid separation tube, and including a plurality of second holes, wherein the clean case further comprises a bottom wall located between the first discharge port and the barrier wall in the extending direction, and a side wall connected to the bottom wall and enclosing the inner wall and the introduction portion, the second discharge port is provided on the side wall, and the liquid from which the foreign matter is separated that rises along the air layer from the first discharge port to the gas-liquid separation tube passes through the plurality of first holes and the plurality of second holes and is discharged from the second discharge port to outside the clean case.

2. The separation device of claim 1, wherein the plurality of second holes are larger than the plurality of first holes.

3. The separation device of claim 1, wherein an area enclosed by the inner wall of the gas-liquid separation tube in the extending direction is smaller than an area not enclosed by the inner wall of the gas-liquid separation tube.

4. The separation device of claim 1, wherein the second discharge port is located between the bottom wall and the barrier wall in the extending direction, and opened facing an outer circumferential surface of the introduction portion of the cyclone.

5. The separation device of claim 1, wherein the inner wall is located more on the cyclone side than a liquid surface of the liquid stored in the clean case, from which the foreign matter is separated.

6. The separation device of claim 1, further comprising a connecting tube provided in an interior of the cyclone and extending from the connecting hole toward the first discharge port, wherein one end of the gas-liquid separation tube is connected to the connecting tube.

7. The separation device of claim 6, wherein an inner diameter of the gas-liquid separation tube is equal to an inner diameter of the connecting tube.

* * * * *